Dec. 31, 1963     H. LEITER     3,115,966
SAMPLE TESTING MACHINE

Filed May 4, 1959     4 Sheets-Sheet 1

INVENTOR
HARRY LEITER
BY Jacob Trachtman
ATTORNEY.

Dec. 31, 1963     H. LEITER     3,115,966
SAMPLE TESTING MACHINE
Filed May 4, 1959     4 Sheets-Sheet 2
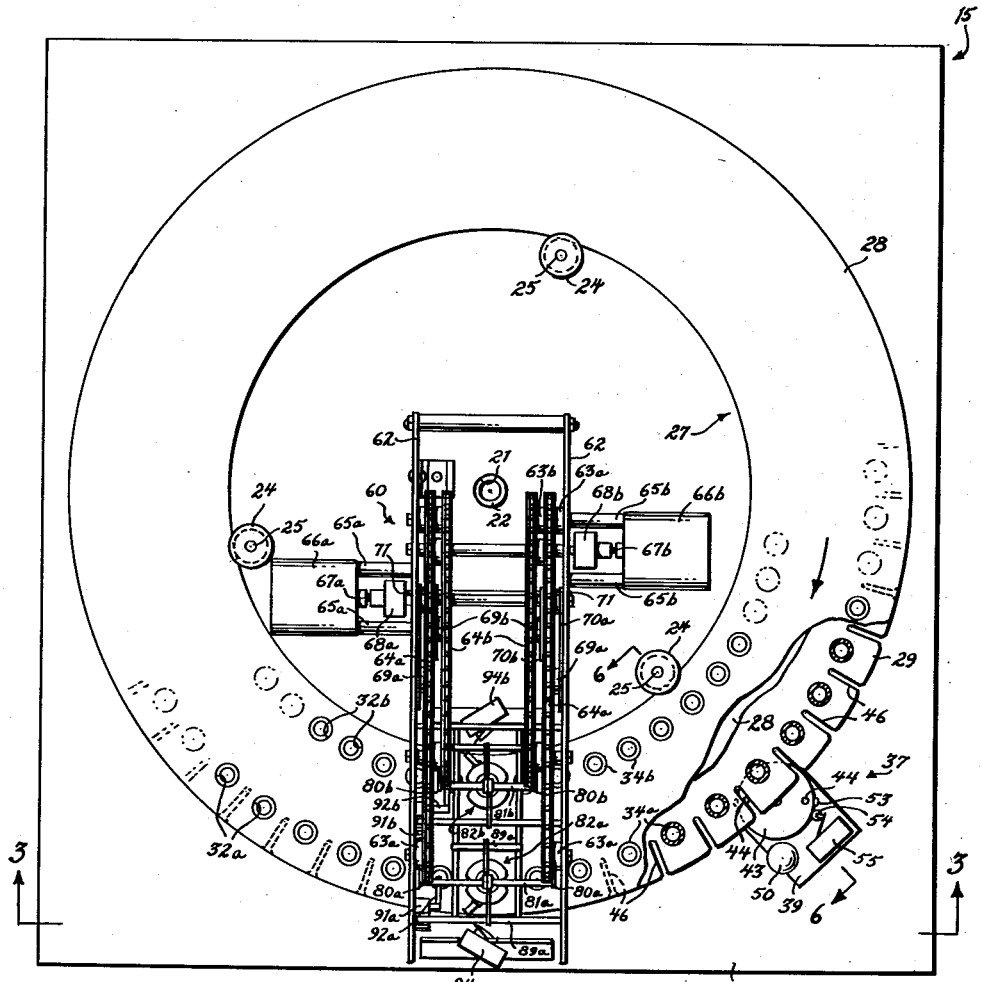
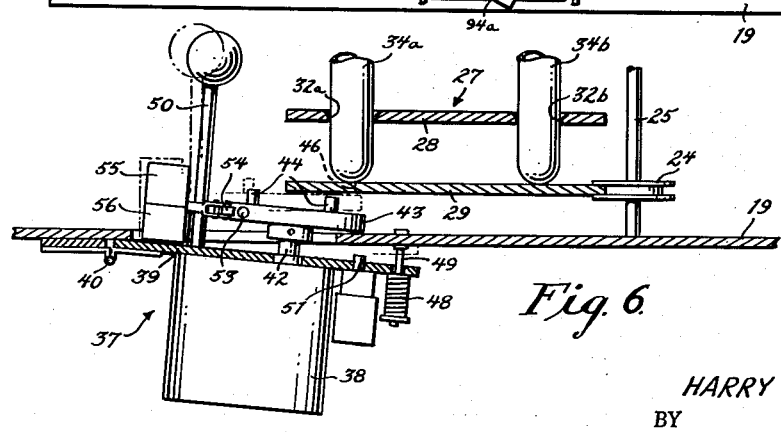
INVENTOR.
HARRY LEITER
BY Jacob Trachtman
ATTORNEY.

Dec. 31, 1963   H. LEITER   3,115,966
SAMPLE TESTING MACHINE
Filed May 4, 1959   4 Sheets-Sheet 3

INVENTOR.
HARRY LEITER
BY Jacob Trachtman
ATTORNEY.

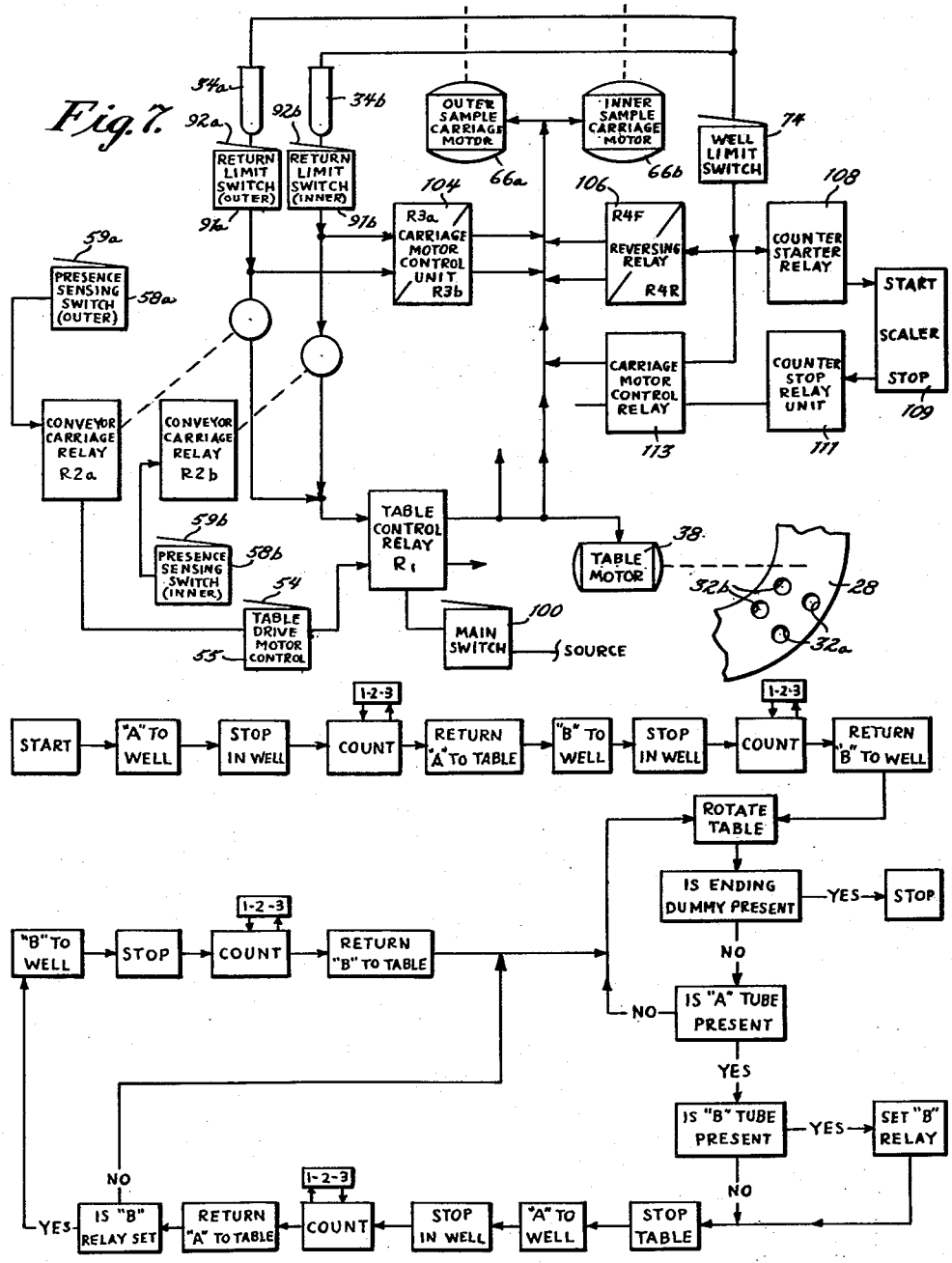

United States Patent Office 3,115,966
Patented Dec. 31, 1963

3,115,966
SAMPLE TESTING MACHINE
Harry Leiter, 5644 Cedar Ave., Philadelphia, Pa.
Filed May 4, 1959, Ser. No. 810,699
6 Claims. (Cl. 198—103)

This invention relates to material handling apparatus and, more particularly, to a method and apparatus for automatically controlling the movement of individual articles between predetermined locations.

In various testing, sampling, treating, and inspection operations, it is sometimes necessary to sequentially move substantially identical articles along predetermined paths for the purpose of carrying out sampling measurements or chemical, electrical, visual, or mechanical tests, or for performing certain steps thereon. In carrying out certain laboratory tests upon various samples or specimens, for example, the individual manual testing steps are not only tedious, time consuming, and expensive, but in many instances errors are introduced that detract from the accurate results desired. It is therefore an object of the present invention to provide material handling apparatus that is automatically programmed to sequentially perform various testing operations upon a large number of samples or specimens, which is extremely accurate in operation, basically simple in design, and which can efficiently process a large number of such samples or specimens in a relatively short period of time.

Another object of the present invention is to provide a method of testing or sampling radioactive specimens that is extremely accurate, and which will produce the same results, regardless of the type, number, arrangement and size of the various specimens used.

Another object of the present invention is to provide material handling apparatus that is completely automatic, can be conveniently operated from a remote location, and which is therefore particularly adapted for handling materials having high or low radioactivity.

An additional object of the present invention is to provide material handling apparatus that can be readily adapted for various types of testing, treating, or sampling operations, for efficiently handling and moving selected specimens or samples through predetermined paths along which various method and processing steps can be initiated.

A more specific object of the present invention is to provide an automatic sample changer for use with well type scintillation counters which will enable various tests to be made with minimum background distortion, uniform results, and without requiring manual operation or control.

A further specific object of the present invention is to provide a method for testing large number of similar specimens in a predetermined sequence of operations, under generally uniform test conditions, and without introducing variable factors that might otherwise reduce the accuracy of the tests.

Still another object of the present invention is to provide a completely automatic testing and sampling apparatus that is extremely compact, can be conveniently stored in a small space, and which can be manually started and automatically stopped to carry out predetermined functions in a minimum amount of time and in a uniform and consistent manner.

In carrying out these objects, material handling apparatus made in accordance with the presence invention is shown in the drawing, for purposes of illustration, particularly adapted for testing radioactive samples contained within test tubes within a well type scintillation counter. The test tubes are mounted upon an annular carrier table that rotates relative to the concentric well, thus assuring a stable environment for the scintillation counter associated with the well at all times. Transport mechanism, including drive means for rotating the article carrier and conveyor means for moving articles between the carrier and the terminal or well, sequentially carries certain samples that are moved into a control station by the rotation of the article carrier, back and forth between the article carrier and the well. A discriminating system controls the movement of each article relative to the terminal, and includes sensing means which controls the rotation of the article carrier, and sequence control means which controls the movement of the conveyor means back and forth between the well and the article carrier. The method of testing and sampling specimens, in accordance with the present invention, includes the steps of moving a plurality of specimen containing articles in a circuitous path around a central terminal, sequentially transporting predetermined ones of the articles between the path and the terminal, and sequentially subjecting all of the predetermined articles to substantially the same operations.

All of the foregoing and still further objects and advantages of this invention will become apparent from a study of the following specification, taken in connection with the accompanying drawing, wherein:

FIGURE 2 is an enlarged cross sectional view taken along line 2—2 of FIGURE 1, with the cabinet removed;

FIGURE 6 is an enlarged fragmentary cross sectional view taken along line 6—6 of FIGURE 2;

FIGURE 7 is a schematic diagram of the control elements of the present invention which determine the sequence of operation of the various parts; and FIGURE 8 is a flow chart showing the programming of the apparatus shown in FIGURES 1 to 6, and controlled by the circuitry illustrated in FIGURE 7.

Figure 1:
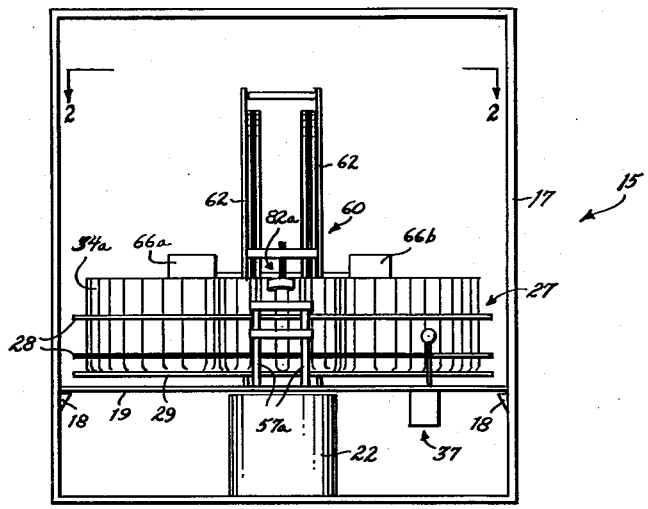
FIGURE 1 is a front elevation view of material handling apparatus made in accordance with the present invention mounted within a cabinet, in actual use.

Referring now more in detail to the drawing, and more particularly to FIGURES 1 to 6 thereof, material handling apparatus 15, made in accordance with the present invention, is shown as a completely self-contained and self-powered assembly mounted within a housing 17 upon a mounting plate 19 secured to brackets 18 carried by the side walls of the housing. The mounting plate 19 has a central opening 21 that is concentric with a restricted opening that communicates with the interior of a shielded chamber 22 of a well type scintillation counter of any well known construction. While this invention is, by way of example, illustrated and described with respect to its use with scintillation counters, it will be recognized that the well 22 may constitute the terminal of any path of movement through which the articles are transported in accordance with the present invention, for any other type of testing, sampling, treatment, or comparable operations.

An article carrier, in the form of a substantially annular platform or table 27, is supported for concentric rotation about the central terminal opening 21 in the mounting plate 19, upon a plurality of circumferentially spaced apart sets of guide rollers 24 that are mounted upon vertical shafts 25. The annular table 27 includes a pair of substantially identical upper and lower plates 28 and an underlying support plate 29, all of which are secured in vertically spaced apart parallel relationship by means of spaced apart spacer posts 30. The inner peripheral edges of the uppermost and lowermost ones of the table plates are guidingly received within the vertically spaced apart guide rollers 24 on each shaft 25, whereby the assembled table is freely rotatable about the terminal opening 21 in the supporting mounting plate 19.

The upper and lower plates 28 are provided with a plurality of circumferentially spaced apart sets of radially spaced apart outer and inner apertures 32a, and 32b that slidably receive articles, such as test tubes 34a, 34b, respectively, in uniformly spaced apart relationship. The lowermost support plate 29 is imperforate, thus underlying the lower extremity of each test tube and supporting it at the proper height. Also, the uppermost edge defining portion of each of the apertures is bevelled, to facilitate the insertion of each such test tube into the respective aligned apertures of the upper and lower plates 28. Thus, each of the articles to be handled, such as the test tubes 34a, 34b, are mounted in the provided sets of apertures which function as poistioning means for maintaining such articles in properly spaced apart and predetermined relationship.

Figure 3:
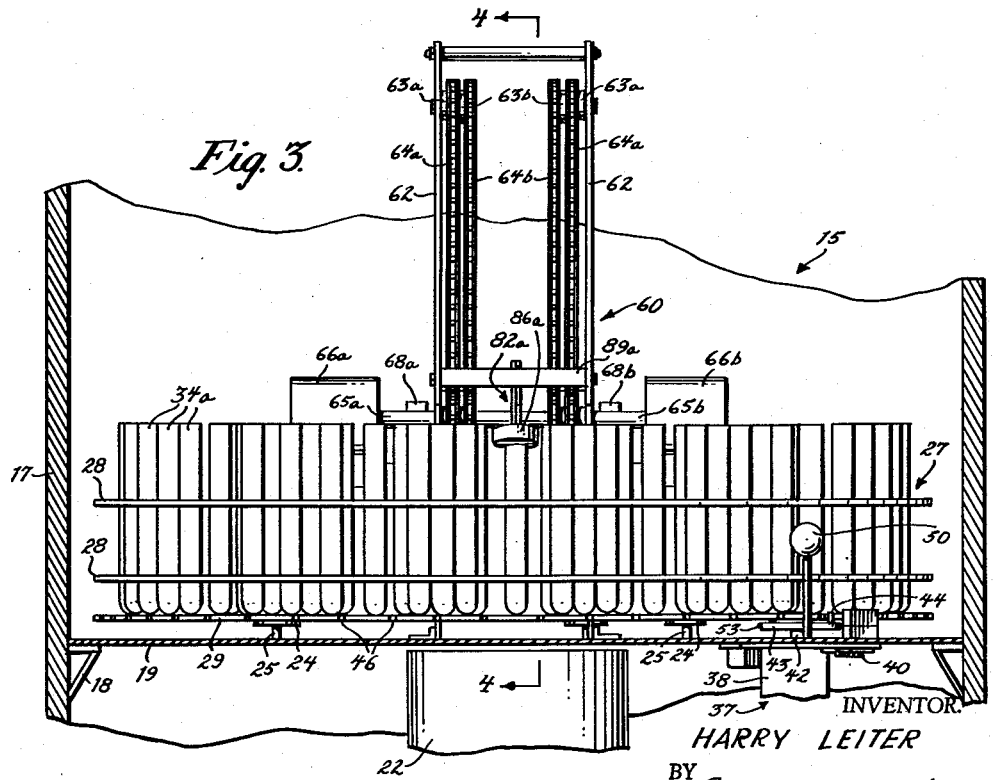
FIGURE 3 is an enlarged fragmentary cross sectional view taken along line 3—3 of FIGURE 2.

As is more clearly shown in FIGURES 2 and 3 of the drawing, a table drive unit 37 forming one part of the general transport means of the present invention, is shown to include a motor 38 mounted upon a plate 39 that is hingedly carried beneath the mounting plate 19 upon a hinge 40 for limited pivotal movement. A spring 48 encircling a rod 49 that is fixed at one end to the mounting plate 19, acts between the opposite end of the rod 49 and the mounting plate 39 to yieldably urge the mounting plate 39 toward an elevated position. However, in response to an inward and downward pressure upon a handle 50, the mounting plate 39 and motor 38 supported thereon, is yieldably movable downwardly a limited amount against the action of the compression spring 48.

A Geneva type drive wheel 43 is secured to the drive shaft 42 of the motor 38 and has a pair of diametrically oppositely disposed drive lugs 44, each of which enters into alternate slots 46 in the outer periphery of the lowermost support plate 29 of the annular table 27. One such slot 46 is provided between each pair of adjacent sets of positioning apertures in the table, whereby the table is rotated the angular distance of one such set of articles for each one-half revolution of the drive wheel 43.

Indexing means are provided for controlling the rotation of the table by the table drive unit 37, in the form of an inactivating switch 55 that is automatically closed by the abutment of one of the diametrically spaced apart detents 53 carried upon the periphery of the drive wheel 43 with the switch follower 54. Thus, as is also shown in FIGURE 6 of the drawing, energization of the motor 38 will cause the drive wheel 43 to rotate so that the drive lug 44 will engage the adjacent slot 46 in the table and rotate the table the equivalent of one increment, following which the detent adjacent to the other such drive lug 44 will engage the follower 54 of the switch 55 and deenergize the motor 38 to prevent further rotation of the table, unless such inactivating switch 55 is over-ridden by a normally closed article presence-sensing switch 58a, forming a part of the general discriminating control assembly, hereinafter more fully described.

The over-riding, presence-sensing switch 58a is mounted upon an outer support 57a, at a predetermined location hereinafter referred to as the control station, with the unidirectional follower 59a thereof normally projecting into the path of movement of the set of articles 34a. Another presence-sensing switch 59b mounted upon an inner support 57b, has a follower 59b which projects into the path of movement of the innermost articles 34b. However, the innermost sensing switch 58b does not over-ride the inactivating switch 55. As both of the presence-sensing switches 58a, 58b are provided with one way followers 59a, 59b, the table may be rotated in a direction opposite to the direction in which it is driven by the motor drive unit 37, to set it at any desired position relative to the control station, simply by depressing the handle 50 of the table drive unit 37 and manually rotating the table 27 to the desired position.

A conveyor unit, forming another part of the general transport means, includes a pair of spaced apart parallel support plates 62 that are mounted on either side of the control station of the apparatus. Individual sets of sprocket wheels 63a, 63b support two sets of endless chains 64a, 64b for movement relative to the outermost one and innermost one of each set of articles 34a, 34b carried upon the annular table, respectively, and the terminal defined by the opening 21 in the supporting plate 19. A pair of motors 66a, 66b, secured to mounting brackets 65a, 65b that are carried by the spaced apart plates 62, each have drive shafts 67a, 67b that are drivingly connected, by means of clutches 68a, 68b to each of the endless chains 64a, 64b. Tensioning sprockets 69a, 69b maintain the desired tension in each of the endless chains 64a, 64b. Each such tension sprocket includes a support plate 70a, 70b, both pivotally mounted at one end upon a pivot pin 71, and each having an individual tension spring 72a, 72b secured at one extremity to the opposite end of each such plate. The opposite end of each spring 72a, 72b is secured to one of the main plates 62, to provide the necessary pressure upon the endless chains for maintaining them in a taut condition at all times.

A limit switch 74, secured upon an adjustable bracket 75 having longitudinally extending slots 76, has an actuating plunger 78 that is mounted in the path of movement of brackets 80a, 80b which are secured to each pair of endless chains 64a, 64b. These brackets rotatably carry transversely extending shafts 81a, 81b, upon which individual article gripper assemblies 82a, 82b are mounted in tandem. Thus, in response to energization to either one of the conveyor drive motors 66a, 66b, the associated endless chain 64a, 64b will displace the particular article gripper assembly 82a, 82b from the control station, adjacent to the articles 34a, 34b, to the terminal adjacent to the opening 21 in the support plate 19. As the gripper assembly approaches the terminal, the outwardly projecting bracket 80a, 80b will engage the plunger 78 of the normally open limit switch 74, to temporarily deenergize the conveyor drive motor 66a, 66b and to initiate a scintillation counter or other suitable apparatus, following which the particular motor 66a, 66b will be reversed and the gripper assembly 82a, 82b returned to the control station, all as will be hereinafter more fully described. Mounting bolts 77 carried upon the main plate 62 allow the position of the mounting plate 75 to be adjusted, to thus control the extent of movement of the gripper assemblies 82a, 82b relative to the aperture 21 in the mounting plate 19.

Figure 4:
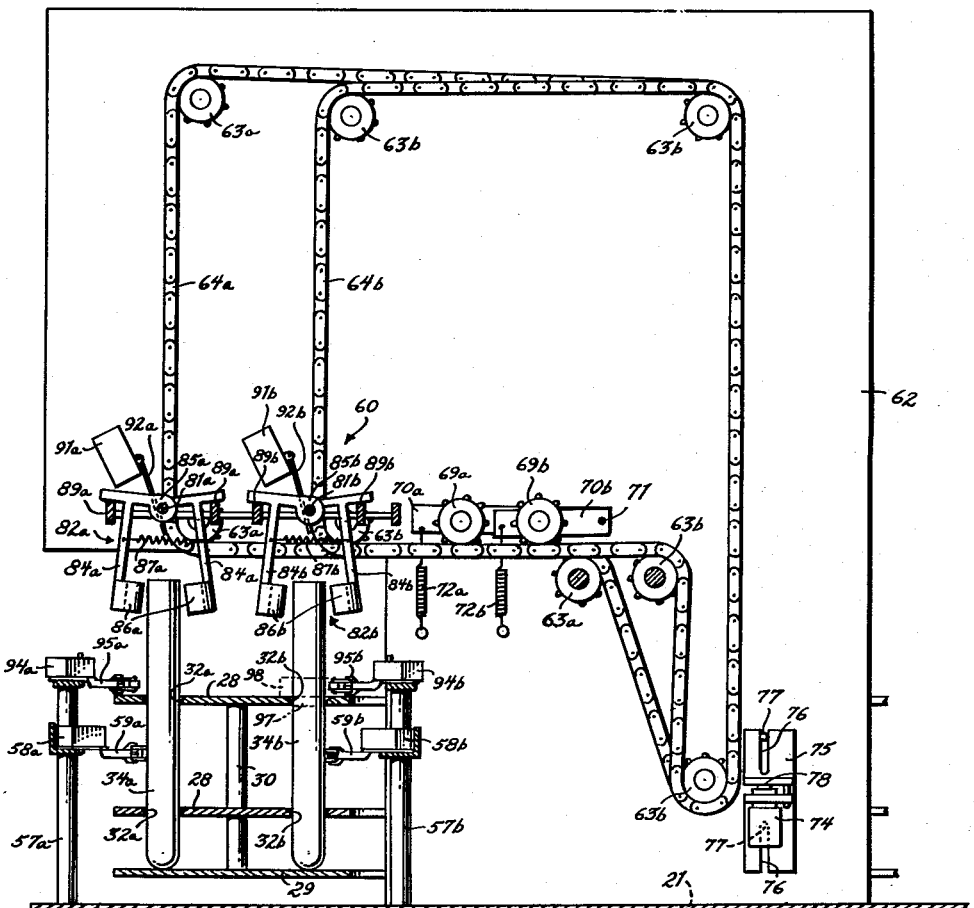
FIGURE 4 is a fragmentary transverse cross sectional view taken along line 4—4 of FIGURE 3.
Figure 5:
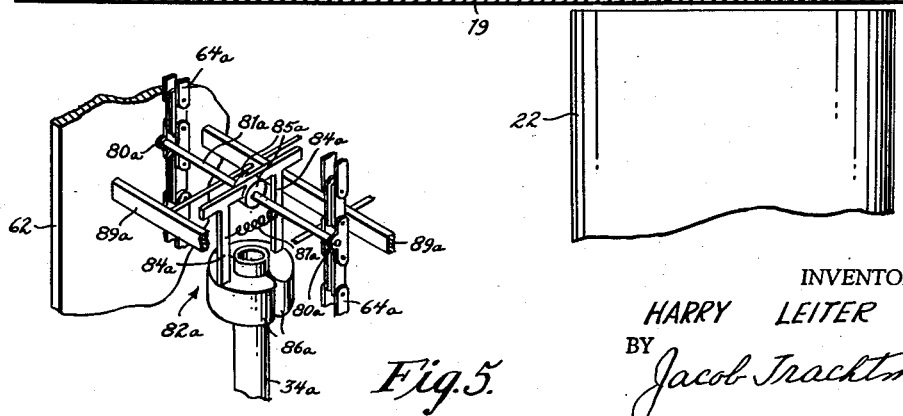
FIGURE 5 is a fragmentary perspective view of certain parts of the sample conveyor mechanism forming a part of the present invention.

Referring now more particularly to FIGURES 4 and 5 of the drawing, each gripper assembly 82a, 82b is shown to include a pair of substantially T-shaped arms 84a, 84b, each secured at one end to a bearing plate 85a, 85b rotatably mounted upon a transport support shaft 81a, 81b. A tension spring 87a, 87b normally urges the stems of the T-shaped arms 84 toward each other, thus urging the supported friction pads 86a, 86b at the lowermost extremities of the T-shaped arms 84a, 84b toward gripping relationship with each other. However, stationary cross pieces 89a, 89b extending between the main mounting plates 62 project into the general path of movement of the T-shaped arms 84a, thus acting to urge the stems of these arms apart, against the action of the associated springs 87a, 87b as the gripper assembly is returned to the control station in the path of movement of the articles 34a, 34b. In the returned position, the T-shaped arms 84a, 84b of the gripper assemblies are in the open position shown in FIGURE 4, thus allowing the articles 34a, 34b to pass therethrough without interference. However, as soon as the gripper assemblies are actuated by the chain drives, the movement of such gripper assemblies away from the cross pieces 89a, 89b will enable the springs 87a, 87b to return the stems of the T-shaped arms 84a, 84b and the associated gripper pads 86a, 86b toward each other, thus frictionally engaging and lifting the articles 34a, 34b out of the respective positioning apertures 32a, 32b in the annular table. Pressure sensitive limit switches 91a, 91b, which form a part of the general sequence control and discriminating circuitry, have followers 92a, 92b disposed in the path of return movement of the gripper assemblies 82a, 82b, and these followers detect the return of such gripper assemblies and close the normally open limit switches 91a, 91b to control the next step of the general programming sequence, as will be hereinafter more fully explained.

Normally open ending switches 94a, 94b are mounted upon the support posts 57a, 57b above each of the presence-sensing switches 58a, 58b, and have followers 95a, 95b that project toward the path of movement of the articles 34a, 34b carried upon the annular table. However, these followers 95a, 95b, which are also unidirectional, do not project into the path of movement of the articles 34a, 34b, themselves, but into the path of movement of removable ending dummies 97 that have enlarged rings 98 which are of greater diameter than the diameter of the articles 34a, 34b. Thus, an ending dummy 97 placed in any one of the upper positioning apertures 32a, 32b of the table will engage the nearest follower arm 95a, 95b of the ending switches 94a, 94b to completely deenergize the entire apparatus when such ending dummy is rotated into the control station. Thus, the operator may determine at what point the apparatus is to be deenergized following a predetermined number of operations.

Reference is now made to FIGURES 7 and 8 of the drawing, wherein the circuitry for a particular handling program is illustrated. The main switch 100 selectively energizes the circuit from any suitable source, whereby energization of the table control relay R1 is operative to effect energization of the table motor 38, to effect rotation of the annular table 27. The table 27 will continue to rotate, under the control of the indexing unit described in connection with FIGURE 6 of the drawing, until the outermost sensing switch 58a is opened by the follower 59a thereof engaging an article 34a moving into the control station adjacent to the conveyor system. Thus, the presence of the next article in the outermost group of articles 34a will cause the normally closed sensing switch 58a to be opened, thus allowing the stop switch 55 of the table drive unit to deenergize the motor 38. However, until an article 34a in the outermost series moves into the control station, the normally closed sensing switch 58a will over-ride the table drive motor control switch 55, to prevent deenergization of the motor 38; thus the table 27 rotates until one of the outermost articles 34a is detected in the control station.

As soon as the next outermost article 34a is detected in the manner hereinbefore described, the sensing switch 58a is opened and thus no longer over-rides the indexing control switch 55. This effects actuation of the conveyor carriage motor carriage relay R2a and the appropriate carriage motor starting relay R3a of the carriage motor control unit 104, simultaneously with the inactivation of the table 27, thus energizing the carriage motor 66a which will effect: rotation of the drive chain 64a, elevation of the outermost gripper assembly 82a, and movement of the outermost article 34a then present in the control station. Also, if the other sensing switch 58b then also senses an inner article 34b in the control station, the other conveyor carriage relay R2b is also energized so as to ready the other carriage motor 66b for energization by the motor control unit 104, as soon as the outermost article 34a is returned to the carrier as detected by closing of the outer pressure sensitive limit switch 91a. The article 34a is carried by the conveyor drive into the well 22 of the counter and is halted by actuation of the limit switch 74, which also activates an automatic counter that determines the amount of time the article is to be retained in the well 22. The limit switch 74 further actuates a motor reversing unit 106 that has directional control relays R4F, R4R, which directly control the direction of rotation of the carriage motors 66a, 66b. As soon as the predetermined period of time has expired, the same carriage motor 66a is energized and, because of the actuation of the reversing relay 106, the carriage 82a will be moved in reverse and the article 34a returned to its initial position within the table positioning apertures 32a at the control station. As the gripper elements 86a release the returned articles 34a, the outermost pressure sensitive limit switch 91a is actuated, which again actuates the reversing relay 106, to set the motors 66a, 66b for forward operation. The closing of this switch 91a also allows the carriage motor control unit 104, to effect instantaneous energization of the other carriage motor 66b, provided that the innermost presence-sensing switch 58b has previously detected the presence of an inner article 34b in the control station at the same time that the outermost article 34a is detected by the outermost presence-sensing switch 58a in the manner hereinbefore described. Thus, the sensing switches 58a, 58b automatically determine the program of the apparatus each time the table is brought to a halt, providing for a continuous series of operations without any unnecessary delays. If, on the other hand, an inner article 34b has not been so detected, the table drive motor 38 is immediately energized and the table 27 set in motion, when the return of the outermost article 34a is detected by the switch 91a and energizes the table control relay R1.

The table 27 will continue in motion until the outermost presence-sensing switch 58a detects the next outer article 34a moving into the control station, or until the presence of an ending dummy 97 actuates either one of the ending switches 94a, 94b, to completely deenergize the entire apparatus. In any case, the table motor 38 cannot be energized as long as either one of the carriages is out of the initial position in the control station as is determined by the position of the pressure switches 91a, 91b. This forms an effective interlock for preventing damage to or improper operation of the apparatus.

A counter switch 56, is actuated by the follower 54 of the indexing switch 55, providing a constant count of the number of increments which the table is rotated by the indexing table drive unit 37.

Each time the limit switch 74 is actuated, the counter starter relay 108 of the scaler 109 initiates the scaler for measuring or evaluating the particular sample retained within the well 22. The scaler can be so programmed as to make any number of individual counts, while the sample remains in the well, such as the three counts indicated in the diagram of FIGURE 8. After the predetermined number have been made, the scaler may be set to actuate a counter stop relay unit 111, which will reset the carriage motor control relay 113. The closing of this relay 113 effects energization of the appropriate carriage motor 66a, 66b, as determined by the setting of the relays R3a, R3b of the carriage motor control unit 104, to effect the return of the carriage positioned over the well.

While the particular program illustrated in FIGURES 7 and 8 may be varied to suit any particular situation, such is but one example of a completely automatic sequence of operations that may be attained by the present apparatus. However, all of the advantages of the present apparatus and method of handling may be conveniently preserved through any particular program of operations. The circuitous path and equi-distant spacing of the sets of samples from the terminal of the test apparatus which, in the present instance, is the well 22, provides a stable test environment or radiation background for producing highly reliable results. Since the effect of each sample upon the terminal area remains constant at all times, each sample is subjected to a test under substantially similar background conditions. The circuitous arrangement of the articles upon the carrier provides for continuous indexing and any number of sequential test runs without resetting or adjusting the positions of the respective articles.

It will aslo be recognized that while the described program tests only those inner articles when respective associated articles 34a are present the program could readily be adjusted to allow for the testing of each of the innermost articles 34b, regardless of the presence of an associated article 34a. However, regardless of whether only the outermost carriage unit 82a or both the outermost and innermost carriage units 82a, 82b, are sequentially actuated, each stroke of the plunger 78 of the limit switch 74 automatically effects actuation of the reversing relay 106 that sets both of the carriage motor 66a, 66b for reverse or forward operation. Thus, there is assurance that both of the motors 66a, 66b are properly set, directionally, at all times.

It will now be recognized that the present apparatus and methods of handling articles may be conveniently adapted for use with various material treatment, testing, sampling, and fabricating operations. However, the provision of a stable test area and equal spacing of the articles particularly suits the present apparatus for use with various types of handling, testing, and sampling operations involving radioactive materials.

While this invention has been described with particular reference to the construction shown in the drawing, it is to be understood that such is not to be construed as imparting limitations upon the invention, which is best defined by the claims appended hereto.

Having thus described my invention, I claim as new and desire to secure by Letters Patent:

1. Material handling apparatus comprising an article carrier having first and second pluralities of adjacent radially displaced and concentrically disposed positioning means for supporting a plurality of articles, conveyor means for moving articles from said carrier to a station which is at the central position of said carrier, drive means for rotating said article carrier with respect to said transport means to sequentially move sets of adjacent first and second article positioning means proximate to said conveyor means, said conveyor means comprising a first carriage for transporting articles supported by said first positioning means and a second carriage for transporting articles supported by said second positioning means, and discriminating means including sequence control means first energizing said drive means for rotating said carrier and article sensing means deactivating said drive means when an article supported by said carrier is positioned proximate to said conveyor means, said sequence control means secondly energizing said conveyor means for moving an article positioned proximate to said conveyor means by said first positioning means of said carrier to said station and return thereof to its first positioning means by said first carriage, said sequence control means thirdly energizing said conveyor means for moving an article positioned proximate to said conveyor means by said second positioning means of said carrier to said station and return thereof to its second positioning means by said second carriage, said sequence control means fourthly energizing said drive means for rotating said carrier and said article sensing means deactivating said drive means when an article supported by said carrier is again positioned proximate said conveyor means.

2. Conveyor means as set forth in claim 1, wherein said carriages are mounted in tandem intermediate said station and said terminal, and one of said carriages is movable past each other carriage during movement between said station and said terminal.

3. Conveyor means as set forth in claim 1, wherein each said carriage has an actuating means which comprises a pair of endless chains, and sprocket drive means guiding said chains for movement past said station and said terminal.

4. Conveyor means as set forth in claim 3, wherein said pair of endless chains of one of said actuating means is between said pair of endless chains of another actuating means.

5. Conveyor means as set forth in claim 1, wherein said carriage comprises a gripper having a pair of clamp-arms normally urged toward a closing position, and abutment means in the vicinity of said station urging said arms toward an open position relative to an article in said station in response to the presence of said gripper in said station.

6. Conveyor means as set forth in claim 5, wherein each one of each pair of clamp-arms comprises a bearing portion pivotally carried upon said actuating means, a depending frictional article engagement portion, a spring normally urging said frictional article engagement portions of each pair of clamp-arms toward each other, and said abutment means comprises a fixed stop carried by said station in the path of movement of said bearing portions urging said article engagement portions of said clamp-arms apart in response to movement of said gripper toward said carrier means.

References Cited in the file of this patent

UNITED STATES PATENTS

| | | |
|---|---|---|
| 1,050,521 | Cunning | Jan. 14, 1913 |
| 2,924,718 | Packard et al. | Feb. 9, 1960 |